UNITED STATES PATENT OFFICE.

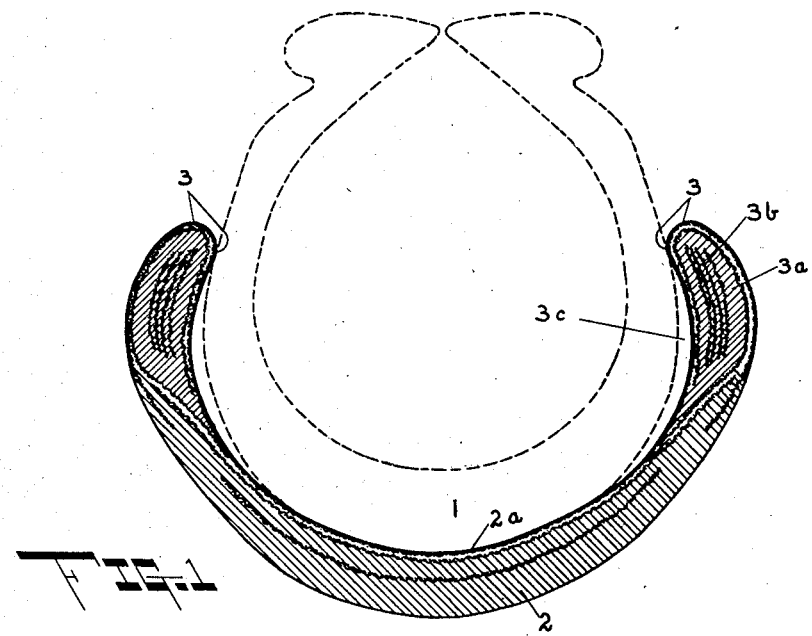
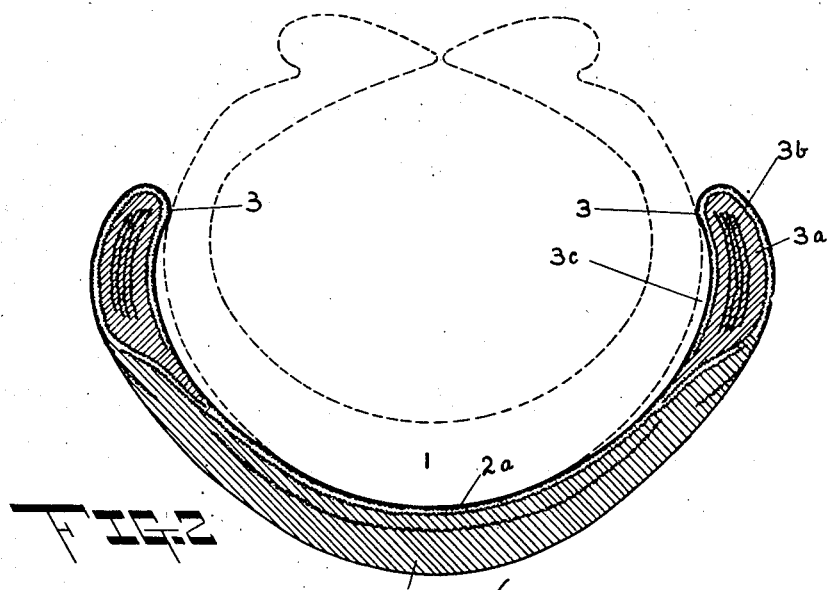

WILLIAM T. DORGAN, OF PEORIA, ILLINOIS, ASSIGNOR TO WILLIAM J. WICKES AND ARTHUR D. EDDY, BOTH OF SAGINAW, MICHIGAN.

TIRE-PROTECTOR.

No. 871,575.    Specification of Letters Patent.    Patented Nov. 19, 1907.

Application filed February 11, 1907. Serial No. 356,841.

*To all whom it may concern:*

Be it known that I, WILLIAM T. DORGAN, a citizen of the United States, residing at Peoria, in the county of Peoria and State of Illinois, have invented certain new and useful Improvements in Tire-Protectors; and I do hereby declare the following to be a full, clear, and exact description of the invention, such as will enable others skilled in the art to which it appertains to make and use the same.

This invention is a tire protector and relates more particularly to protective coverings for pneumatic tires, such as are used on automobiles and other vehicles.

The objects of the invention are first, to provide a tire protector adapted to fit over the tread of the tire and retain its position when the tire is inflated without the aid of external fastening means. Secondly, to so construct the edges or beads of the protector that they will, while seizing the sides of the tire with firm close pressure, yet be capable of yielding to the expanding and contracting movements or "working", of the tire without liability of causing the reinforcing means embedded in the beads of the protector to cut through or loosen.

The improvement consists in the construction of the protector and particularly in the construction of its edges or beads.

In the drawings, Figure 1 is a cross sectional view of a deflated tire with the protector in place, the tire being indicated by dotted lines. Fig. 2 is a similar cross section showing the tire inflated and under pressure, as when the weight of the vehicle rests upon it.

(1) is the tire and (2) is the protector. The protector consists in a sheath of rubber or other suitable material, approximately semicircular in cross section and adapted to slip over the tire while the tire is deflated. When the tire is inflated the beads or edges (3) of the protector are forced outwardly by the expanding tire, and the beads or edges by their resistance to such outward pressure, grip the sides of the tire firmly. The protector requires no other fastening means.

To overcome certain difficulties heretofore experienced, namely,—weakening of the bead or edge of the protector and consequent loosening of its grip upon the tire, resulting in letting dirt and water in between the protector and the tire, I have devised a construction for the beads or edges of the tire protector that holds the edges of the protector tightly against the tire under all conditions of use, such as sudden distortion of the tire by striking an obstruction in the road.

My improved construction insures that the beads or edges of the protector will be as durable as the tread or body of the protector itself. Heretofore the weakening of the beads or edges of the tire protector has been a source of annoyance and expense to users.

In my improved construction I have reinforced the protector as follows—Any desired number of layers of canvas or similar material ($2^a$) extend the entire circumference of the inner side of the protector. At the edges of the protector the canvas encircles an elongated vulcanized rubber "bead" ($3^a$). The bead ($3^a$) is vulcanized to the tread (2) so that the complete protector is in a single piece. Extending the whole length of this bead and vulcanized into it to form a core ($3^b$) are a number of strips of tough fibrous material such as canvas or cloth.

The vulcanized rubber bead ($3^a$) is preferably of a tougher or less flexible material than the tread (2) of the protector. The bead is preferably of the form shown in the drawings, being of elongated cross section, the lower portion of the bead being beveled and the outer beveled face being overlapped by the material of the tread (2).

I have found in practice that the edge or bead of a tire protector of the class here described is subject to excessive tearing or twisting strains, and that round beads reinforced with wire or similar material rapidly wear out, because of the metal core becoming loose in the vulcanized rubber that surrounds it. The core ($3^b$) of the bead ($3^a$) in my invention not only provides the necessary tensile strength for the bead ($3^a$), but becomes an actual and integral part of the bead. It can not therefore, become loose, no matter how much the bead is subjected to twisting or tearing strain.

The elongated form of the bead is of especial advantage in holding the protector in place. I prefer to make the bead, as shown in the drawings, of such contour on its inner surface that it will engage the tire only at its edge (3), leaving a clearance or relief between the tire and protector just below the edge (3), as shown at ($3^c$). There is therefore, with my improved construction, always a tight close contact between the edge (3) of the protector and the side of the tire, no matter what distortion the tire may be subjected to in use. Great intensity of pressure at the line of contact is thus secured and the joint so formed is tight. When the tread of the tire flattens slightly under the load of the vehicle, the edge (3) of the protector moves up a very small amount on the periphery of the tire, but under no circumstances will it spring away from the tire and admit dirt or water between the tire and protector. This feature is of the greatest importance in practical use of tire protectors and arises from the construction of the elongated relatively hard interiorly relieved bead (3ª) which gives clearance between the tire and the protector, as above described, so that the grip of the protector on the tire is unaffected by distortion of the tire.

In practice I prefer to make the tread of the protector of a material best suited for tire treads, such as comparatively soft rubber, but the bead (3ª) I prefer to make of harder and stiffer vulcanized rubber, so that the bead will hold its shape and preserve the clearance (3ᶜ) under any amount of distortion to which the tire is liable to be subjected in use.

Having thus fully disclosed my invention, what I claim as new is—

1. A tire protector comprising a sheath of suitable material, approximately semi-circular in cross-section, the edges of said sheath being formed with a bead of elongated cross-section, said bead being curved on its inner surface and adapted to grip the tire with the edge of the bead.

2. A tire protector comprising a sheath of suitable material, approximately semi-circular in cross section, the edges of said sheath being formed with a bead having a core of fibrous material embedded therein, said bead being curved on its inner surface and adapted to grip the tire with the edge of the bead.

3. A tire protector comprising a tread portion, elongated beads formed integral with the tread portion and adapted to grip the sides of the tire with the edges of the beads.

4. A tire protector comprising a sheath of suitable material, approximately semi-circular in cross-section, the edges of said sheath being formed with a bead of elongated cross-section, said bead being made of less flexible material than the tread, and curved on its inner surface and adapted to grip the tire with the edge of the bead.

5. A tire protector comprising a tread portion, a bead on each edge thereof, said beads having their inner faces recessed, the edges of the beads adapted to grip the tire.

In testimony whereof I affix my signature in presence of two witnesses.

WILLIAM T. DORGAN.

Witnesses:
   ALFRED W. NORRIS,
   WILLIAM J. MICHES.